United States Patent
Hart et al.

[11] Patent Number: 6,034,613
[45] Date of Patent: Mar. 7, 2000

[54] SHOCK AND VIBRATION SENSOR

[75] Inventors: Edward E. Hart, Springfield; Michael Allen Stickelman, Dayton, both of Ohio

[73] Assignee: Spectra Precision, Inc., Dayton, Ohio

[21] Appl. No.: 08/926,901

[22] Filed: Sep. 10, 1997

[51] Int. Cl.[7] .................................................. G08B 21/00
[52] U.S. Cl. ...................... 340/683; 340/665; 200/61.08; 73/651; 73/654
[58] Field of Search ................................. 340/683, 665, 340/590; 200/61.08; 73/650, 651, 654, 658, 665, 662; 359/708, 181

[56] References Cited

U.S. PATENT DOCUMENTS

| | | | |
|---|---|---|---|
| 3,909,568 | 9/1975 | Greenhug | 200/61.45 |
| 3,936,621 | 2/1976 | Palin et al. | 200/61.08 |
| 4,327,359 | 4/1982 | Kurtz | 340/566 |
| 4,698,623 | 10/1987 | Smith | 340/665 |
| 4,810,999 | 3/1989 | Moshier | 340/550 |
| 5,378,864 | 1/1995 | Olivier et al. | 200/61.08 |
| 5,657,001 | 8/1997 | Wilson | 340/611 |
| 5,754,115 | 5/1998 | Woo | 340/665 |

*Primary Examiner*—Jeffery A. Hofsass
*Assistant Examiner*—Anh La
*Attorney, Agent, or Firm*—Killworth, Gottman, Hagan & Schaeff, LLP

[57] ABSTRACT

A sensor assembly for monitoring shocks and vibrations on sensitive devices is provided. The sensor assembly comprises a detector beam supported between a pair of support members. A detector weight is secured to the detector beam between the support members. The detector beam is fracturable in response to the application of a predetermined level of force. An electrical circuit may be coupled to the detector beam for monitoring electrical continuity and structural integrity of the detector beam. The detector beam provides passive monitoring as the detector beam will fracture irrespectively of the power state of the electrical circuit. One or more detector beams may be used to monitor forces along a variety of different axes.

26 Claims, 4 Drawing Sheets

SHOCK AND VIBRATION SENSOR

BACKGROUND OF THE INVENTION

The present invention relates in general to a shock and vibration sensor, and, more particularly, to a shock and vibration sensor for use in a laser transmitter.

Laser systems have been employed in numerous surveying and construction applications. In one such system, a laser light transmitting device provides a rotating laser beam which establishes a reference plane. Typically, the rotating laser beam is used to define, in effect, a continuous plane of light as a constant horizontal bench mark of elevation over an entire work area. The laser light is either detected by the naked eye or by one or more laser beam detectors, placed at considerable distances from the transmitting device. Various construction tasks can be performed based on the visual perception of the laser light. The detectors are used to intercept the rotating laser beam and determine an elevation at selected points throughout the work area. Such detectors may provide a display of the beam height for an operator or, alternatively, may form part of a machine control system that controls or assists in the control of various pieces of equipment, such as for example bulldozers and motorgraders.

In the laser light transmitting device, the generally horizontal plane of light is produced by projecting the beam upward and then deflecting the beam ninety degrees within a pentaprism or penta-mirror assembly. The pentaprism assembly is rotated about a generally vertical axis within the transmitting device to cause the horizontal beam to sweep around the axis and define the horizontal plane. Such a laser light transmitting device includes various components susceptible to damage or misalignment from excessive impact forces or vibrations. It is therefore desirable to provide an indication to the user when the laser light transmitting device has sustained an excessive shock or vibration so that the device may be inspected for any damage to the transmitting device or misalignment of key components. Further, the laser light transmitting device must be capable of sensing excessive shocks or vibrations passively, e.g., when the device is being shipped and at other times when the device is not receiving electrical power.

One type of sensor which can passively monitor shocks and vibrations is disclosed in U.S. Pat. No. 3,909,568 issued to Greenhug on Sep. 30, 1975. Greenhug discloses a sensor in which a pair of opposing balls are supported in a recessed portion of a pair of corresponding arms and separated from each other by a spring. The balls are dislodged upon the application of a predetermined force along the measuring axis of the sensor. The level of this predetermined force is dependent on a number of interrelated factors, such as the unstressed height of the spring, the weight of the balls, the size of the balls in relation to size of the recessed portions of the arms, and the extent to which the spring is compressed when it is in its operative position and the spacing between the balls. Such a sensor is physically large and difficult to reset once tripped. Further, the manufacture of such a sensor is expensive and complicated.

Accordingly, there is a need in the art for a shock and vibration sensor which is simple and inexpensive to manufacture. There is a further need for a shock and vibration sensor which is relatively small in size and simple to reset once triggered.

SUMMARY OF THE INVENTION

The present invention meets the aforementioned needs by providing a simple and relatively small shock and vibration sensor. The shock and vibration sensor comprises a detector beam supported by a pair of opposing posts. The detector beam is fracturable upon the application of a predetermined level of force such that the sensor provides an indication of the application of such a predetermined level of force upon the fracture of the detector beam. The detector beam is preferably electrically conductive and coupled to an electric circuit so that upon the fracture of the detector beam a break in the electric circuit is detected. A pair of detector beams substantially perpendicular to each other may be used to sense the application of a predetermined level of force about three main measurement axes. The sensor is easily reset by replacing the detector beam.

According to a first aspect of the present invention, a sensor assembly comprises a first sensor device. The first sensor device comprises a first base, a first support member and a second support member coupled to the first base, and a first detector beam supported by the first support member and the second support member. The first and second support members are separated from each other by a first predetermined distance while the first detector beam is fracturable in response to the application of a first predetermined level of force. The sensor assembly indicates the application of a first level of force equal to or greater than the first predetermined level of force on the first sensor device upon fracturing of the first detector beam.

The first sensor device may comprise a first detector weight secured to the first detector beam between the first and second support members. The first detector beam may comprise electrically conductive material and the sensor assembly may comprise an electric circuit coupled to the first detector beam. The sensor assembly then indicates the application of the first level of force equal to or greater than the first predetermined level of force on the first sensor device upon an indication of electrical discontinuity through the first detector beam. The first detector beam is preferably substantially cylindrical with a diameter of approximately 0.3 mm. Preferably, the first detector beam comprises brittle material, and specifically, mechanical pencil lead. The first predetermined force may be at least 2 g's, and preferably, at least 50 g's.

The sensor assembly may further comprise a second detector device comprising a second base, a third support member and a fourth support member coupled to the second base, and a second detector beam supported by the third support member and the fourth support member. The third and fourth support members are separated from each other by a second predetermined distance while the second detector beam is fracturable in response to the application of a second predetermined level of force. The sensor assembly indicates the application of a second level of force equal to or greater than the second predetermined level of force on the second sensor device upon fracturing of the second detector beam. The first sensor device may be positioned so that the first detector beam is fracturable in response to the application of the first predetermined level of force with respect to at least a first axis, and the second sensor device may be positioned so that the second detector is fracturable in response to the application of the second predetermined level of force with respect to at least a second axis. The first and second sensor devices may be positioned so that the second detector beam is substantially perpendicular to the second detector beam and the first axis is substantially perpendicular to the second axis. The first and second detector beams may be fracturable in response to the application of the first and second predetermined levels of force with respect to a third axis which is substantially perpendicular to the first axis and a second axis.

Preferably, the first base is integral with the second base while the first predetermined force substantially equals the second predetermined force. Preferably, the first and second detector beams comprise electrically conductive material while the sensor assembly further comprises an electric circuit coupled to the first detector beam and the second detector beam, such that the sensor assembly indicates the application of the first level of force equal to or greater than the first predetermined level of force on the first sensor device or the application of the second level of force equal to or greater than the second predetermined level of force on the second sensor device upon an indication of electrical discontinuity through the first detector beam or through the second detector beam. The first detector beam may be serially connected with the second detector beam while the electrical circuit is serially connected to the first and second detector beams.

According to another aspect of the present invention, a laser transmitting device comprises a housing, a laser light source coupled to the housing and generating laser light, and a sensor assembly coupled to the housing. The sensor assembly comprises a first sensor device having a first base, a first support member and a second support member coupled to the first base, and a first detector beam supported by the first support member and the second support member. The first and second support members separated from each other by a first predetermined distance while the first detector beam is fracturable in response to the application of a first predetermined level of force. The sensor assembly indicates the application of a first level of force equal to or greater than the first predetermined level of force on the housing upon fracturing of the first detector beam.

The first sensor device may comprise a first detector weight secured to the first detector beam between the first and second support members. The first detector beam may comprise electrically conductive material while the sensor assembly comprises a continuity checker coupled to the first detector beam. The sensor assembly then indicates the application of the first level of force equal to or greater than the first predetermined level of force on the housing upon an indication of electrical discontinuity through the first detector beam. Preferably, the first detector beam is substantially cylindrical and has a diameter of approximately 0.3 mm. Preferably, the first detector beam comprises brittle material, and specifically, mechanical pencil lead. The first predetermined force may be at least 2 g's, and preferably, at least 50 g's.

The sensor assembly may further comprise a second detector comprising a second base, a third support member and a fourth support member coupled to the second base, and a second detector beam supported by the third support member and the fourth support member. The third and fourth support members are separated from each other by a second predetermined distance while the second detector beam is fracturable in response to the application of a second predetermined level of force. The sensor assembly indicates the application of a second level of force equal to or greater than the second predetermined level of force on the housing upon fracturing of the second detector beam. The first sensor device may be positioned so that the first detector beam is fracturable in response to the application of the first predetermined level of force with respect to at least a first axis while the second sensor device may be positioned so that the second detector is fracturable in response to the application of the second predetermined level of force with respect to at least a second axis. The first and second sensor devices are preferably positioned so that the first detector beam is substantially perpendicular to the second detector beam with first axis being substantially perpendicular to the second axis. The first and second detector beams may be fracturable in response to the application of the first and second predetermined levels of force with respect to a third axis which is substantially perpendicular to the first axis and second axis.

Preferably, the first base is integral with the second base while the first predetermined force substantially equals the second predetermined force. The first and second detector beams may comprise electrically conductive material while the sensor assembly may further comprise an electrical circuit coupled to the first detector beam and the second detector beam, such that the sensor assembly indicates the application of the first level of force equal to or greater than the first predetermined level of force or the second level of force equal to or greater than the second predetermined level of force on the housing upon an indication of electrical discontinuity through the first detector beam or through the second detector beam. Preferably, the first detector beam is serially connected with the second detector beam and the electrical circuit is serially connected to the first and second detector beams.

According to yet another aspect of the present invention, a laser transmitting device comprises a housing, a laser light source coupled to the housing and generating laser light, and a sensor assembly coupled to the housing. The sensor assembly comprises a first sensor device, a second sensor device and an electric circuit. The first sensor device comprises a first base, a first support member and a second support member coupled to the first base, a first detector beam supported by the first support member and the second support member, and a first detector weight. The first and second support members are separated from each other by a first predetermined distance with the first detector weight being secured to the first detector beam between the first and second support members. The first detector beam comprises electrically conductive material and is fracturable in response to the application of a first predetermined level of force. The second sensor device comprises a second base, a third support member and a fourth support member coupled to the second base, a second detector beam supported by the third support member and the fourth support member, and a second detector weight. The third and fourth support members are separated from each other by a second predetermined distance with the second detector weight being secured to the second detector beam between the third and fourth support members. The second detector beam comprises electrically conductive material and is fracturable in response to the application of a second predetermined level of force. The electrical circuit is coupled to the first detector beam and the second detector beam, such that the sensor assembly indicates the application of a first level of force equal to or greater than the first predetermined level of force or a second level of force equal to or greater than the second predetermined level of force on the housing upon an indication of electrical discontinuity through the first detector beam or through the second detector beam.

The first sensor device may be positioned so that the first detector beam is fracturable in response to the application of the first predetermined level of force with respect to at least a first axis while the second sensor device may be positioned so that the second detector is fracturable in response to the application of the second predetermined level of force with respect to at least a second axis. The first and second sensor devices are preferably positioned so that the first detector beam is substantially perpendicular to the second detector beam with the first axis being substantially perpendicular to the second axis. The first and second detector beams may be fracturable in response to the application of the first and second predetermined levels of force with respect to a third axis which is substantially perpendicular to the first axis and the second axis. Preferably, the first base is integral with the second base. The first and second detector beams may be substantially cylindrical and have a diameter of approximately 0.3 mm. Preferably, the first and second detector beams comprise brittle material, and specifically, mechanical pencil lead.

Accordingly, it is an object of the present invention to provide a shock and vibration sensor which is relatively small and simple in construction. It is a further object of the present invention to provide a shock and vibration sensor which is inexpensive to manufacture and easy to reset when triggered. Other features and advantages of the invention will be apparent from the following description, the accompanying drawings and the appended claims.

DETAILED DESCRIPTION OF THE PREFERRED EMBODIMENTS

Figure 1:
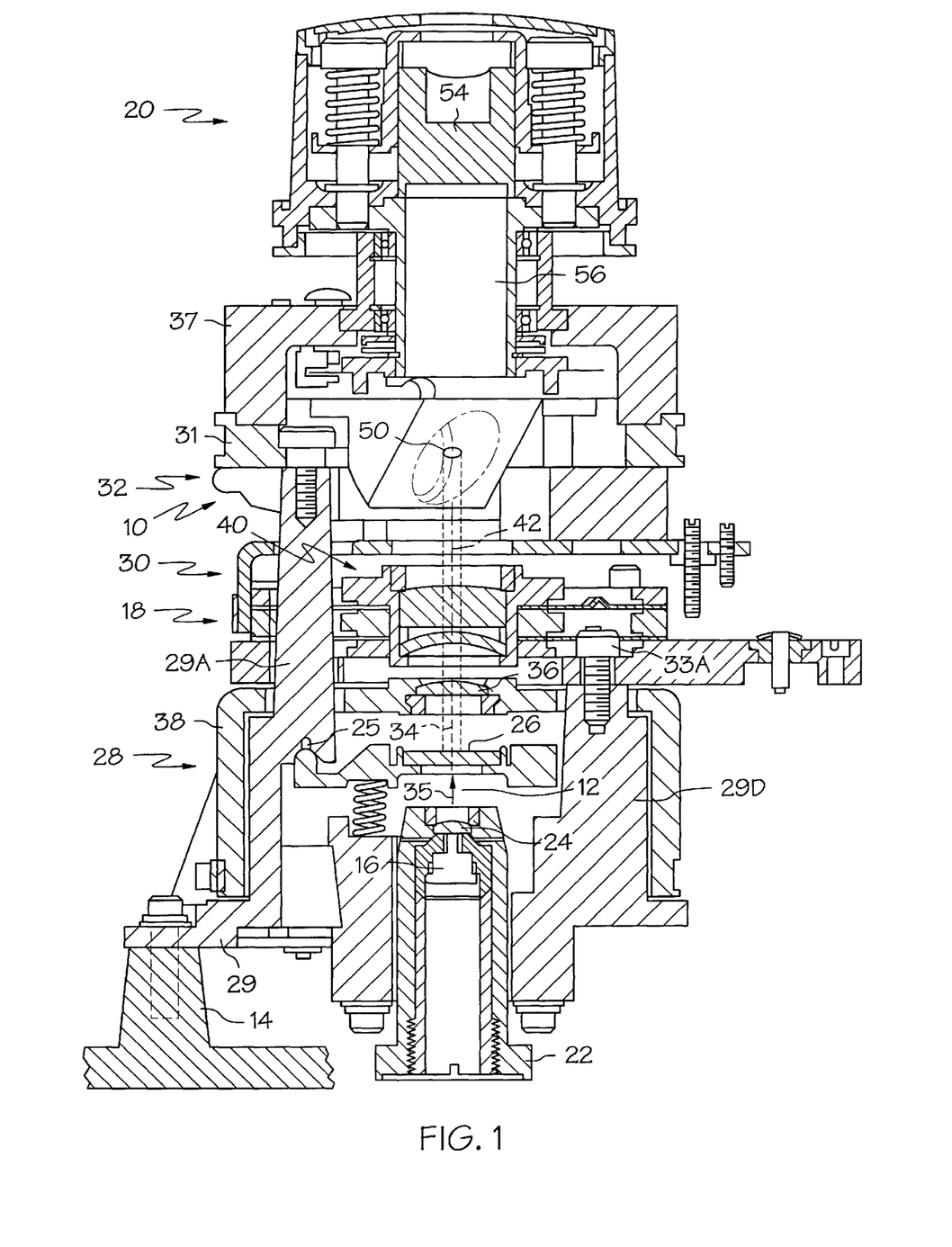
FIG. 1 is a cross-sectional view of a laser transmitter according to the present invention.

Referring now to FIG. 1, a laser transmitter 10 for transmitting a beam of laser light 12 is shown. The laser transmitter 10 includes a housing 14, a light source 16, an optical assembly 18 and an optical projecting device 20. The light source 16 is coupled to an assembly 22. According to the illustrated embodiment, the light source 16 is a laser diode which generates the beam of laser light 12. The assembly 22 includes a collection lens 24 that is positioned above the light source 16. The collection lens 24 serves to collect the laser beam 12 and project it in a first direction 35. Preferably, the collection lens 24 is a planar convex lens which collimates the laser beam 12.

The optical assembly 18 includes a flat window 26, a compensator assembly 28 and a focusing mechanism 30. The compensator assembly 28 includes an optics frame 29, a compensator cup 38 and a wire clamp ring 31. The optics frame 29 is coupled to and supported by the housing 14. The assembly 22 is coupled to the optics frame 29. The flat window 26 is positioned above the collection lens 24. The flat window 26 is pivotally coupled to the optics frame 29 through a spherical pivot 25. The flat window 26 tilts along an X-axis and a Y-axis using two calibration screws (not shown). The position of the flat window 26 is finely adjusted by the calibration screws so that the laser beam 12 is projected along a substantially vertical axis or first axis 34. The laser beam 12 will therefore be plumb when the optics frame 29 is positioned along a plane which is substantially parallel with respect to the plane of the ground, i.e., substantially level. A plumb beam of light is light which is projected substantially vertical with respect to the ground. The laser beam 12 is projected along the first axis 34 by the light source 16 and the collection lens 24 and made plumb through the flat window 26. It should be apparent that the laser beam will be plumb as long as the optics frame 29 is substantially level with respect to the ground.

Figure 2:
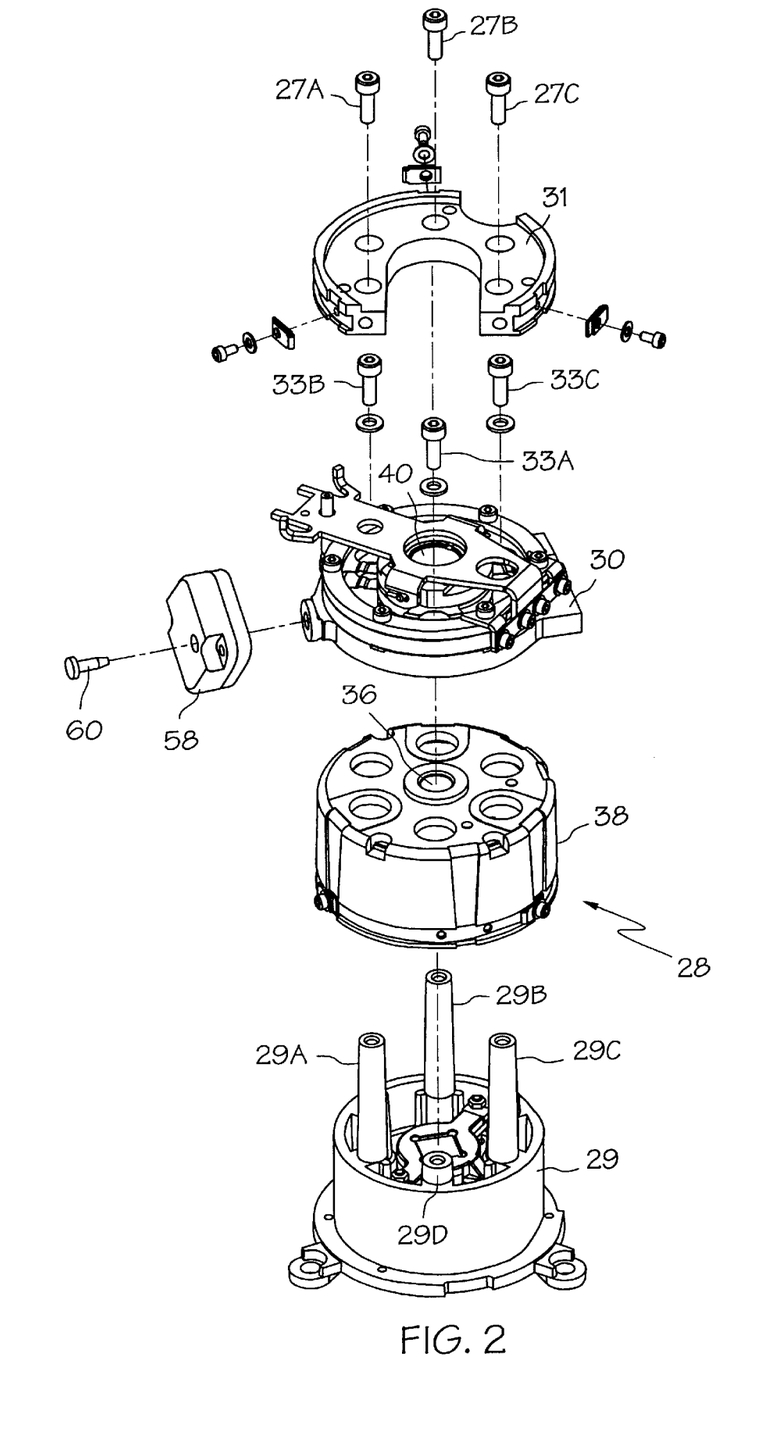
FIG. 2 is an exploded view of a compensator assembly shown in FIG. 1.

The compensator assembly 28 optically adjusts the position of the laser beam 12 so that it is plumb even when the optics frame 29 is not substantially level. As shown in FIGS. 1 and 2, the compensator assembly 28 includes a compensating lens 36 mounted in the center of the compensator cup 38. The compensator cup 38 is positioned above the flat window 26 and swings freely on three wires (not shown) which are attached to the wire clamp ring 31. The wire clamp ring 31 is coupled to the optics frame 29 through three posts 29A, 29B, 29C by fasteners 27A, 27B, 27C. The compensator cup 38 is free to translate laterally when it is within a certain degree of level. In the illustrated embodiment, the compensator cup 38 is free to translate when it is within 12 minutes of level. As long as the compensator cup 38 is within 12 minutes of level, the compensating lens 36 may translate along the X and Y axes and optically adjust the position of the laser beam 12 so that it is plumb as it emerges from the compensator cup 38. The compensator cup 38 is suspended from the wire clamp ring 31 which is coupled to the optics frame 29 of the compensator assembly 28, so that once the compensator assembly 28 is within 12 minutes of level, the compensator cup 38 is also within 12 minutes of level. The compensator lens 36 may then optically adjust the position of the laser beam 12 so that it is plumb as it emerges from the compensator cup 38. The compensator assembly 28 therefore compensates optically for misalignments of the optics frame 29 which are within 12 minutes of level. It should be apparent that the flat window 26 and the compensator assembly 28 function to project the laser beam 12 along first axis 34, either singularly or in tandem.

The focusing mechanism 30 is positioned above the compensator cup 38 and coupled to the optics frame 29 through three small posts (only one post 29D shown) by three fasteners 33A, 33B, 33C. The three posts 29A, 29B, 29C of the optics frame 29 pass through the focusing mechanism 30 so that the focusing mechanism 30 does not contact the compensator cup 38. The focusing mechanism 30 includes a focusing lens 40 which may be translated along the first axis 34 to adjust the focus of the laser beam 12. The focusing mechanism 30 is positioned so that the first axis 34 coincides with an optical axis 42 of the focusing lens 40. A plumb beam of laser light 12 is focused by the focusing mechanism 30 along the optical axis 42. In the illustrated embodiment, the focusing mechanism 30 is disabled such that the position of the focusing lens 40 is fixed. However, the focusing mechanism 30 may include a focus motor (not shown) or a manual system for changing the position of the focusing lens 40, and thereby adjusting the focus of the laser beam 12. The focusing mechanism 30 is described in detail in copending application, U.S. Ser. No. 08/834,473 (Attorney Docket No. SPC 301 PA), FOCUSING MECHANISM USING A THIN DIAPHRAGM, filed Apr. 11, 1997, by Hayes, herein incorporated by reference. It will be appreciated by those skilled in the art that another focusing mechanism may be used without departing from the scope of the present invention. It will be further appreciated by those skilled in the art that the present invention may be practiced with or without the focusing mechanism 30.

The wire clamp ring 31 is positioned above the focusing mechanism 30. The wire clamp ring 31 is the upper most portion of the compensator assembly 28. The wire clamp ring 31 includes the three wires (not shown) for suspending the compensator cup 38. All of the optical components are coupled to either the optics frame 29 or the wire clamp ring 31. Consequently, the compensator assembly 28 is the main frame of reference for the laser transmitter 10.

Referring again to FIG. 1, the optical projecting device 20 is coupled to the wire clamp ring 31 through a mounting ring 37. The optical projecting device 20 includes a motor (not shown) and a pentaprism 54 within a spindle 56. The optical projecting device 20 is positioned above the focusing mechanism 30 to deflect the laser beam 12 ninety degrees with respect to vertical. The pentaprism 54 is a structure which deflects incoming light at a ninety-degree angle with respect to the direction of the incoming light, within limits, regardless of the precise orientation of the pentaprism 54. Consequently, the incoming light does not have to hit the pentaprism 54 at an exact location in order to be deflected ninety degrees. The pentaprism 54 is rotated within the spindle 56 by the motor at a speed of approximately 50 rpm to define a substantially horizontal plane of light. A speed of 50 rpm is well suited for visible perception of the laser light 12 by the user. However, as will be appreciated by those skilled in the art the pentaprism 54 may be rotated at any reasonable speed without departing from the scope of the present invention. While a pentaprism is used in the illustrated embodiment to deflect the incoming light, other light deflecting devices, such as a pentamirror, mirror, prism, reflector or refractor may also be used. While the laser transmitter 10 has been described with the laser light 12 being transmitted upwards, it will be appreciated by those skilled in the art that optical components may be shifted appropriately so that the laser light 12 is transmitted downwards, with the optical projecting device 20 being the lower most component and the light source 16 and assembly 22 being the upper most components. It will be further appreciated by those skilled in the art that the compensator cup 38 may be locked in place with the laser transmitting device 10 positioned on its side so as to project a generally vertical beam of light.

The optical assembly 18 and the optical projecting device 20 work together to project the substantially horizontal beam of light. The components making up the optical assembly and the optical projecting device 20 are susceptible to misalignment or damage from excessive forces or vibrations. If one or more of the components are damaged or misaligned, the laser transmitter 10 will not be able to project the substantially horizontal beam of light. Accordingly, as shown in FIG. 2, the laser transmitter 10 includes a sensor assembly 58 for monitoring shock and vibration forces on the laser transmitter 10. The sensor assembly 58 is coupled to the focusing mechanism 30 using a fastener 60. The sensor assembly 58 is centrally located within the laser transmitter 10 so that it can monitor forces applied to the laser transmitter 10 and specifically to the housing 14.

Figure 3:
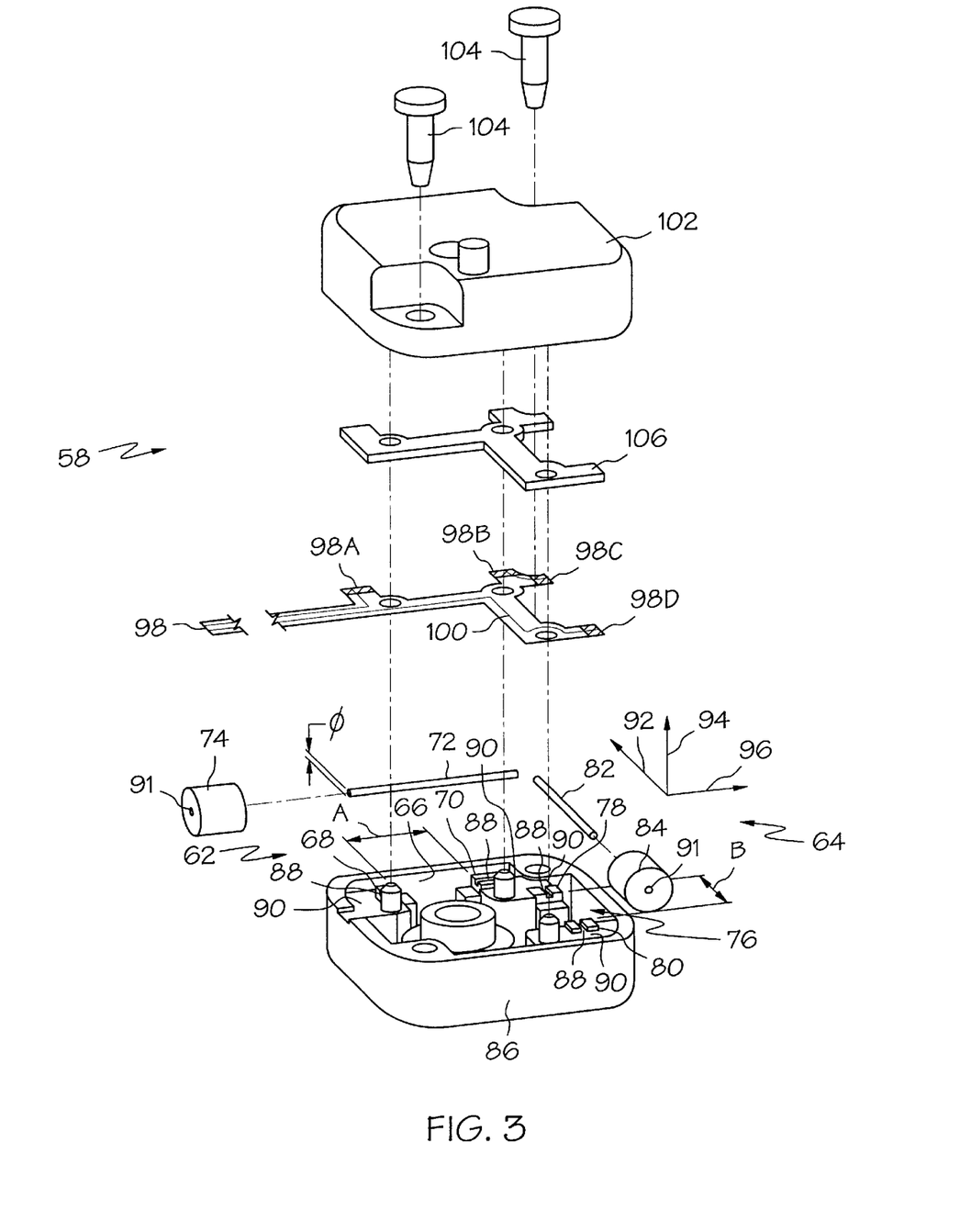
FIG. 3. is an exploded view of a sensor assembly shown in FIG. 2.

Referring now to FIG. 3, the sensor assembly 58 comprises a first sensor device 62 and a second sensor device 64. The first sensor device 62 comprises a first base 66, a first support member 68, a second support member 70, a first detector beam 72, and a first detector weight 74. The second sensor device 64 comprises a second base 76, a third support member 78, a fourth support member 80, a second detector beam 82 and a second detector weight 84. In the illustrated embodiment, the first and second bases 66 and 76 are integrally joined, thereby forming a single bottom housing structure 86. As the first and second bases 66 and 76 are integrally joined, the first and second sensor devices 62 and 64 form a commonly housed detector unit. However, it will be appreciated by those skilled in the art that the first and second bases 66 and 76 may be discrete and separate components such that the first and second sensor devices 62 and 64 form separate and distinct detector units.

The first and second support members 68 and 70 are coupled to the first base 66 and separated from each other by a first predetermined distance A while the third and fourth support members 78 and 80 are coupled to the second base 76 and separated from each other by a second predetermined distance B. In the illustrated embodiment, the support members 68, 70, 78, 80 are integrally formed with the first and second bases 66, 76 as part of the bottom housing structure 86. However, it will be appreciated by those skilled in the art that the support members 68, 70, 78 and 80 may be formed separately and secured to the bases 66, 76 using adhesives, conventional fasteners, or the like. The bottom housing structure 86, and thus, the support members 68, 70, 78, 80 and the bases 66, 76, are formed of a polymer, preferably, a thermoplastic, such as polycarbonate. The polymer is preferably injection molded to form the above-mentioned components in the desired positions and configurations.

Each of the support members 68, 70, 78 and 80 includes a longitudinal slot 88 and a shelf 90 for receiving and supporting the detector beams 72, 82. The detector beams 72, 82, are positioned within the slots 88 with the ends resting on the shelves 90. As shown in FIG. 3, the slots 88 are sized to prevent lateral or side to side movement of the detector beams 72, 82. In the illustrated embodiment, the detector beams 72, 82 are substantially cylindrical having a predetermined diameter φ. It will be appreciated by those skilled in the art that the detector beams 72, 82 may have any reasonable shape and cross-sectional dimensions. The first and second detector weights 74 and 84 are secured to the respective detector beam 72, 82 and positioned between the respective support members 68, 70, 78, 80. In the illustrated embodiment, the detector weights 74, 84 are substantially cylindrical and include a substantially cylindrical bore 91 sized so as to mate with the respective detector beam 74, 84. The bores 91 are sized so that the detector weights 74, 84 are secured firmly to the detector beams 72, 82 and substantially locked into position once set. It will be appreciated by those skilled in the art that the detector weights may have any reasonable shape and may be secured to the detector beams 72, 82 in a variety of reasonable ways. The detector weights 74 and 84 may be composed of any suitable material so long as the detector weights 74 and 84 are of the desired mass for the reasons set forth below. In the illustrated embodiment, the detector weights 74, 84 are composed of a metal, such as brass.

The first sensor device 62 is positioned substantially perpendicular to the second sensor device 64 so that the detector beams 72 and 82 are substantially perpendicular to each other. The detector beams 72 and 82 will fracture in response to a predetermined level of force in a direction perpendicular to a plane perpendicular to the length of the beams. As two axes form a standard plane, the first and second sensor devices 62 and 64 monitor forces with respect to two perpendicular axes, herein referred to as measuring axes. The first detector beam 72 will fracture in response to the application of a first level of force which is equal to or greater than a first predetermined level of force about a first plane comprising a first or X-axis 92 and a third or Z-axis 94. The second detector beam 82 will fracture in response to the application of a second level of force which is equal to or greater than a second predetermined level of force about a second plane comprising a second or Y-axis 96 and the Z-axis 94. Accordingly, the sensor assembly 58 is configured to provide an indication that it has been subjected to a force equal to or greater than the first or second predetermined levels of force. The above axes are perpendicular to each other and form a standard three-dimensional coordinate system. As a result, the sensor assembly 58 may be positioned in any desired location and monitor the applied forces with respect to all three axes. It will be appreciated by those skilled in the art that the detector beams 72, 82 may be supported about one of the two monitoring axes so that the sensor devices 62 and 64 only monitor the applied forces with respect to one axis. It will be further appreciated by those skilled in the art that the first and second sensor devices 62 and 64 may be positioned to monitor any desired axis. The first and second predetermined forces may be substantially equal or different depending on the particular application.

The levels of the first and second predetermined forces which causes the detector 72, 82 to fracture are dependent on a number of interrelated factors, such as the material used to form the detector beams 72, 82, the diameter of the detector beams 72, 82, the distance between the respective support members 68, 70 and 78, 80, and the length and mass of the detector weights 72, 82. It will be appreciated by those skilled in the art that depending on the first three factors, a detector weight may not be needed. In the illustrated embodiment, the detector beams 72, 82 comprise a brittle material, such as mechanical pencil lead having a diameter of approximately 0.3 mm and a hardness rating of 2H. Such mechanical pencil lead is commercially available from PENTEL® under the trademark of SUPER HI-POLYMER® Lead. Such detector beams 72, 82 combined with detector weights 74, 84 having a length of approximately 5.26 mm and a mass of approximately 0.56 grams along with a distance of approximately 5.5626 mm between support members yields a predetermined force greater than 50 g's. It will be appreciated by those skilled in the art that the predetermined forces may be adjusted by changing one or more of the above factors. For example, the predetermined force may be lowered to approximately 2 g's by increasing the mass of the detector weight 74, 84.

The use of mechanical pencil lead has a number of important advantages. First, such lead is very inexpensive. Second, it is widely available. Third, the lead is available in a variety of different diameters and hardness ratings so that a wide variety of force levels may be achieved. Finally, the composition of each piece of pencil lead is substantially the same for a given diameter, hardness and manufacturer, so that the material strength of the pencil lead is predictable. Accordingly, the detector beams 72, 82 will fracture at substantially the same level of force each time. The monitoring feature of the sensor assembly 58 is thus repeatable by simply replacing the pencil lead with the same type of pencil lead.

The detector beams 72 and 82 are also electrically conductive so that the electrical continuity, and hence, the structural integrity of the detector beams 72, 82 may be monitored electrically. The detector beams 72 and 82 are serially connected by a standard flexible circuit board 98. The flexible circuit board 98 includes finger portions 98A, 98B, 98C and 98D which extend over the shelves 90 and are electrically coupled to corresponding ends of the detector beams 72, 82. The finger portions 98A–98D are composed of an electrically conductive material, such as carbon ink. The finger portions 98A–98D are coupled to circuit traces 100 running along a top surface 98E of the flexible circuit board 98. The circuit traces 100 are formed of an electrically conductive material, such as silver ink. The circuit traces 100 combined with the finger portions 98A–98D and the detector beams 72 and 82 form a serial circuit. The flexible circuit board 98 also includes appropriate layers of dielectric material and an electrically nonconductive polymer, such as polyester.

The flexible circuit board 98 and the detector beams 72, 82 are held in place by a top housing structure 102 which is secured to the bottom housing structure 86 by fasteners 104. The top housing structure 102 includes support structures (not shown) which are sized and configure to mate with the support members 68, 70, 78, 80 and the shelves 90 so as to secure the flexible circuit board 98 and the detector beams 72, 82 in place. A foam gasket 106 is positioned between the flexible circuit board 98 and the top housing structure 102 to protect the flexible circuit board 98 from damage as the top and bottom housing structures 102 and 86 are fastened together. The top housing structure 102 is also formed of a polymer, preferably, a thermoplastic, such as polycarbonate. The polymer is preferably injection molded to form the support structures in the desired positions and configurations as well as to give the top housing structure the desired shape.

Figure 4:
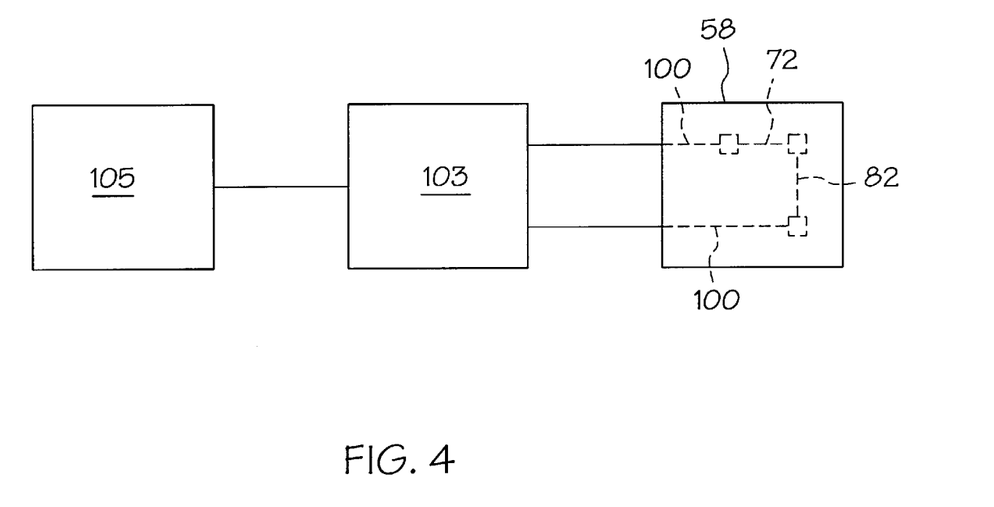
FIG. 4 is a schematic diagram of an electric circuit for monitoring the sensor assembly of FIG. 3.

As shown schematically in FIG. 4, the flexible circuit board 98 is coupled to an electric circuit 103. The electric circuit 103 transmits a current of relatively low magnitude through the flexible circuit board 98 and the detector beams 72 and 82. As long as the serial circuit is complete, the current will flow. The electric circuit 103 is coupled to a processor 105 which monitors the state of the electric circuit 103. The processor 105 periodically monitors the electric circuit 103 for the presence of the current. The processor 105 will indicate that there has been a break in the circuit, and hence, fracture of one or both of the detector beams 72, 82, when there has been an interruption of the current flow. The indication may be an audio or visual alarm notifying the operator that the laser transmitter 10 has experienced a shock or vibration equal to or greater than the predetermined value. The operator will then inspect or have the laser transmitter 10 inspected for damage.

Once the inspection is complete, and after any repairs are completed, the fractured detector beam may be simply replaced with a new detector beam. The detector beam is easily replaced by removing the top housing structure 102 along with the foam gasket 106 and the flexible circuit board 98. The fractured detector beam is removed and the new detector beam is position in place after the corresponding detector weight is secured to the new detector beam. The flexible circuit board 98 and the foam gasket 106 are repositioned over the detector beams 72, 82 and the top housing structure 102 is then reattached to the bottom housing structure 86. It will be appreciated by those skilled in the art that the processor 105 may be configured so as to monitor the electrical continuity of the detector beams 72, 82 without the intervening electric circuit 98. Conversely, the electric circuit 98 may monitor the detector beams 72, 82 and provide the indication of fracture directly without using the processor 105. For example, a simple light bulb may be appropriately connected to the electric circuit 98 to provide the indication of fracture.

It will be appreciated by those skilled in the art that the above described monitoring process may be performed in a variety of ways. The detector beams 72 and 82 may be electrically coupled using wires which are either directly coupled to the detector beams 72 and 82 or indirectly coupled through an intervening element, such as a conventional mounting post. Further, the electrical continuity of the detector beams 72 and 82 may be monitored individually with each detector beam 72, 82 being coupled to separate electric circuits. In such an arrangement, the detector beams 72 and 82 are not coupled in series but actually comprise separate electric circuits.

It will be further appreciated by those skilled in the art that conductive material may be added to the detector beams 72, 82 to increase the overall electrical conductivity of the beams or to make them electrically conductive in the first place if the detector beams 72, 82 are composed of a non-conductive material. Another advantage of using mechanical pencil lead is that the lead is sufficiently electrically conductive for electrical monitoring purposes such that further or additional material processing is not required. It will be appreciated by those skilled in the art that fracture of the detector beams 72, 82 may be determined without using any type of separate monitoring system. The top housing structure 102 may be formed of a transparent material and the sensor assembly 58 may be positioned so that the user may visually inspect the detector beams 72, 82 directly for evidence of fracture. While electrical monitoring of the detector beams 72, 82 is more convenient, visual inspection may be easily performed.

The sensor assembly 58 of the present invention is particularly advantageous in that it can monitor for the application of excessive shocks and vibration even when the laser transmitter 10 is not receiving electrical power. The detector beams 72, 82 will fracture upon the application of a level of force equal to or greater than the predetermined level of force along the corresponding measuring axis regardless of the power state of the laser transmitter 10 such that once electrical power is applied to the laser transmitter 10, the processor 105 will indicate fracture of one or both of the detector beams 72, 82.

While the sensor assembly 58 has been described in relation to monitoring a laser transmitter for excessive shocks and vibrations, the sensor assembly 58 may be used for any type of laser transmitter or for other types of devices which are susceptible to such excessive shocks and vibrations. For example, the sensor assembly 58 may be used to indicate when a sensitive device has been dropped or abused during shipping thereby protecting the manufacturer's reputation when the customer receives a non-working product due to rough handling during shipment. As the sensor assembly 58 may be configured to respond to a wide variety of shock and vibration levels, the sensor assembly 58 may be customized based on the user's exact needs and intended application. It will be further appreciated by those skilled in the art that the sensor assembly 58 may be integrally formed with the device it is monitoring.

Having described the invention in detail and by reference to preferred embodiments thereof, it will be apparent that modifications and variations are possible without departing from the scope of the invention defined in the appended claims.

What is claimed is:

1. A laser transmitting device comprising
   a housing;
   a laser light source coupled to said housing and generating laser light; and
   a sensor assembly coupled to said housing, said sensor assembly comprising:
      a first sensor device comprising:
         a first base;
         a first support member and a second support member coupled to said first base, said first and second support members separated from each other by a first predetermined distance; and
         a first detector beam supported by said first support member and said second support member, said first detector beam being fracturable in response to the application of a first predetermined level of force;
      wherein said sensor assembly indicates the application of a first level of force equal to or greater than said first predetermined level of force on said housing upon fracturing of said first detector beam.

2. The laser transmitting device of claim 1, wherein said first sensor device further comprises a first detector weight secured to said first detector beam between said first and second support members.

3. The laser transmitting device of claim 1, wherein said first detector beam comprises electrically conductive material and wherein said sensor assembly further comprises a continuity checker coupled to said first detector beam, such that said sensor assembly indicates the application of said first level of force equal to or greater than said first predetermined level of force on said housing upon an indication of electrical discontinuity through said first detector beam.

4. The laser transmitting device of claim 1, wherein said first detector beam is substantially cylindrical.

5. The laser transmitting device of claim 4, wherein said first detector beam has a diameter of approximately 0.3 mm.

6. The laser transmitting device of claim 1, wherein said first detector beam comprises mechanical pencil lead.

7. The laser transmitting device of claim 1, wherein said first detector beam comprises brittle material.

8. The laser transmitting device of claim 1, wherein said first predetermined force is at least 2 g's.

9. The laser transmitting device of claim 1, wherein said first predetermined force is at least 50 g's.

10. The laser transmitting device of claim 1, wherein said sensor assembly further comprises a second detector device, said second detector device comprising:
   a second base;
   a third support member and a fourth support member coupled to said second base, said third and fourth support members separated from each other by a second predetermined distance; and
   a second detector beam supported by said third support member and said fourth support member, said second detector beam being fracturable in response to the application of a second predetermined level of force;
   wherein said sensor assembly indicates the application of a second level of force equal to or greater than said second predetermined level of force on said housing upon fracturing of said second detector beam.

11. The laser transmitting device of claim 10, wherein said first sensor device is positioned so that said first detector beam is fracturable in response to the application of said first predetermined level of force with respect to at least a first axis, and wherein said second sensor device is positioned so that said second detector is fracturable in response to the application of said second predetermined level of force with respect to at least a second axis.

12. The laser transmitting device of claim 11, wherein said first and second sensor devices are positioned so that said first detector beam is substantially perpendicular to said second detector beam and said first axis is substantially perpendicular to said second axis.

13. The laser transmitting device of claim 12, wherein said first detector beam is fracturable in response to the application of said first predetermined level of force with respect to a third axis, and wherein said second detector beam is fracturable in response to the application of said second predetermined level of force with respect to said third axis, said third axis being substantially perpendicular to said first axis and second axis.

14. The laser transmitting device of claim 10, wherein said first base is integral with said second base.

15. The laser transmitting device of claim 10, wherein said first predetermined force substantially equals said second predetermined force.

16. The laser transmitting device of claim 10, wherein said first and second detector beams comprise electrically conductive material, and wherein said sensor assembly further comprises an electrical circuit coupled to said first detector beam and said second detector beam, such that said sensor assembly indicates the application of said first level of force equal to or greater than said first predetermined level of force or said second level of force equal to or greater than said second predetermined level of force on said housing upon an indication of electrical discontinuity through said first detector beam or through said second detector beam.

17. The laser transmitting device of claim 16, wherein said first detector beam is serially connected with said second detector beam, and wherein said electrical circuit is serially connected to said first and second detector beams.

18. A laser transmitting device comprising
   a housing;
   a laser light source coupled to said housing and generating laser light; and
   a sensor assembly coupled to said housing, said sensor assembly comprising:
      a first sensor device comprising:
         a first base;
         a first support member and a second support member coupled to said first base, said first and second support members separated from each other by a first predetermined distance;
         a first detector beam supported by said first support member and said second support member, said first detector beam comprising electrically conductive material and being fracturable in response to the application of a first predetermined level of force; and
         a first detector weight secured to said first detector beam between said first and second support members;
      a second sensor device comprising;
         a second base;
         a third support member and a fourth support member coupled to said second base, said third and fourth support members separated from each other by a second predetermined distance;
         a second detector beam supported by said third support member and said fourth support member, said second detector beam comprising electrically conductive material and being fracturable in response to the application of a second predetermined level of force; and
         a second detector weight secured to said second detector beam between said third and fourth support members; and
      an electrical circuit coupled to said first detector beam and said second detector beam, such that said sensor assembly indicates the application of a first level of force equal to or greater than said first predetermined level of force or a second level of force equal to or greater than said second predetermined level of force on said housing upon an indication of electrical discontinuity through said first detector beam or through said second detector beam.

19. The laser transmitting device of claim 18, wherein said first sensor device is positioned so that said first detector beam is fracturable in response to the application of said first predetermined level of force with respect to at least a first axis, and wherein said second sensor device is positioned so that said second detector is fracturable in response to the application of said second predetermined level of force with respect to at least a second axis.

20. The laser transmitting device of claim 19, wherein said first and second sensor devices are positioned so that said first detector beam is substantially perpendicular to said second detector beam and said first axis is substantially perpendicular to said second axis.

21. The laser transmitting device of claim 20, wherein said first detector beam is fracturable in response to the application of said first predetermined level of force with respect to a third axis, and wherein said second detector beam is fracturable in response to the application of said second predetermined level of force with respect to said third axis, said third axis being substantially perpendicular to said first axis and second axis.

22. The laser transmitting device of claim 18, wherein said first base is integral with said second base.

23. The laser transmitting device of claim 18, wherein said first and second detector beams are substantially cylindrical.

24. The laser transmitting device of claim 23, wherein said first and second detector beams each have a diameter of approximately 0.3 mm.

25. The laser transmitting device of claim 18, wherein said first and second detector beams comprise mechanical pencil lead.

26. The laser transmitting device of claim 18, where said first and second detector beams each comprise brittle material.

* * * * *